(12) United States Patent
Eld et al.

(10) Patent No.: US 10,007,904 B2
(45) Date of Patent: Jun. 26, 2018

(54) METHODS, SERVER, MERCHANT DEVICE, COMPUTER PROGRAMS AND COMPUTER PROGRAM PRODUCTS FOR SETTING UP COMMUNICATION

(75) Inventors: Mattias Eld, Spanga (SE); Petter Arvidsson, Bromma (SE); Goran Selander, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 328 days.

(21) Appl. No.: 13/806,451

(22) PCT Filed: Jun. 29, 2010

(86) PCT No.: PCT/SE2010/050745
§ 371 (c)(1),
(2), (4) Date: Dec. 21, 2012

(87) PCT Pub. No.: WO2012/002852
PCT Pub. Date: Jan. 5, 2012

(65) Prior Publication Data
US 2013/0103590 A1  Apr. 25, 2013

(51) Int. Cl.
G06Q 20/32 (2012.01)
G06Q 20/40 (2012.01)
H04L 29/06 (2006.01)

(52) U.S. Cl.
CPC ..... *G06Q 20/3227* (2013.01); *G06Q 20/3229* (2013.01); *G06Q 20/40* (2013.01); *H04L 63/0823* (2013.01)

(58) Field of Classification Search
CPC ...... G06Q 20/00–20/425; H04L 63/00–63/308
(Continued)

(56) References Cited

U.S. PATENT DOCUMENTS 6,332,133 B1 * 12/2001 Takayama .................. 705/39
7,103,575 B1 *  9/2006 Linehan ................ G06Q 20/12
235/379
(Continued)

FOREIGN PATENT DOCUMENTS

EP   1544822 A1   6/2005
JP   2003036406 A   2/2003
(Continued)

OTHER PUBLICATIONS

Ron White, How Computers Work, Oct. 15, 2003, Que Publishing, 7th Ed, p. 4. (Year: 2003).*
(Continued)

*Primary Examiner* — Mohammad A. Nilforoush
(74) *Attorney, Agent, or Firm* — Rothwell, Figg, Ernst & Manbeck, P.C.

(57) ABSTRACT

It is presented a security server arranged to set up communication between a merchant device and a customer payment application. The security server comprises: a receiver arranged to receive a first message comprising a customer identifier, an application identifier and a security token; a determiner arranged to determine whether the merchant device is authorized; a transmitter arranged to send a second message to the merchant device, the second message indicating that the merchant device is authorized to effect payment; and a channel establisher arranged to set up a secure channel between the merchant device and the customer payment application in a secure element being adapted to be comprised in a mobile communication terminal, wherein all communication between the merchant device and the customer payment application is controlled by the security server. Corresponding methods, merchant device, computer programs and computer program products are also presented.

24 Claims, 6 Drawing Sheets

(58) Field of Classification Search
USPC .................................................. 705/50–500
See application file for complete search history.

(56) References Cited

U.S. PATENT DOCUMENTS

| | | | |
|---|---|---|---|
| 2002/0038420 A1* | 3/2002 | Collins | H04L 9/3263 713/156 |
| 2002/0107007 A1* | 8/2002 | Gerson | 455/414 |
| 2002/0152179 A1 | 10/2002 | Racov | |
| 2004/0039692 A1* | 2/2004 | Shields | G06Q 20/04 705/39 |
| 2005/0149544 A1* | 7/2005 | Bishop et al. | 707/101 |
| 2006/0053290 A1 | 3/2006 | Randle et al. | |
| 2007/0022058 A1 | 1/2007 | Labrou et al. | |
| 2007/0278290 A1* | 12/2007 | Messerges et al. | 235/380 |
| 2008/0167000 A1* | 7/2008 | Wentker | G06Q 20/10 455/408 |
| 2008/0209538 A1 | 8/2008 | Malakapalli et al. | |
| 2009/0106160 A1* | 4/2009 | Skowronek | 705/75 |
| 2010/0106649 A1 | 4/2010 | Annan | |
| 2010/0121767 A1* | 5/2010 | Coulter | G06Q 20/02 705/67 |
| 2013/0013353 A1* | 1/2013 | Fisher | 705/5 |

FOREIGN PATENT DOCUMENTS

| | | |
|---|---|---|
| JP | 2007041993 A | 2/2007 |
| WO | 0184763 A2 | 11/2001 |
| WO | 2009035824 A2 | 3/2009 |

OTHER PUBLICATIONS

Office Action dated Jun. 7, 2013, in corresponding Japanese Application No. 2013-518310, 2 pages.
Communication dated Oct. 27, 2014, issued in European Patent Application No. 10854186.3-1958, 5 pages.
Extended European Search Report dated Dec. 13, 2013, issued in European Patent Application No. 10854186.3, 7 pages.
Decision on Grant of Patent dated Oct. 15, 2014, in connection with Russian Patent Application No. 2013103723/08(005326), 20 pages.
Official Action dated Jun. 20, 2014, in connection with Russian Patent Application No. 2013103723/08(005326), 5 pages.

\* cited by examiner

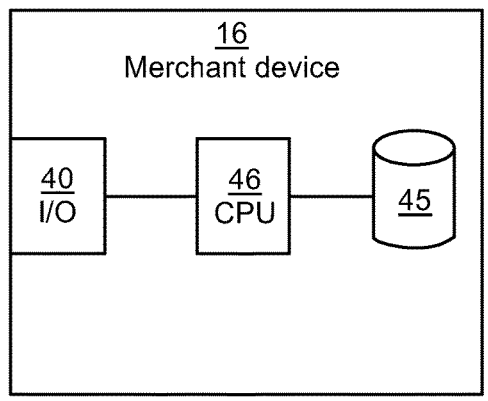
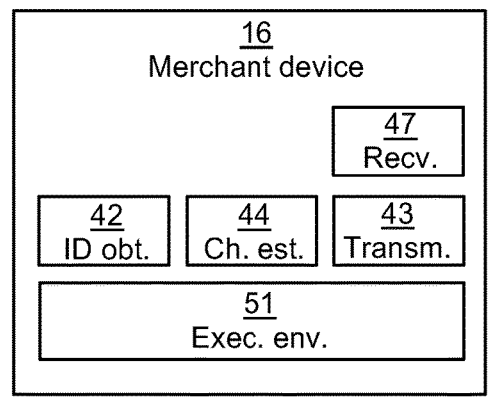
Fig. 3a
Fig. 3b
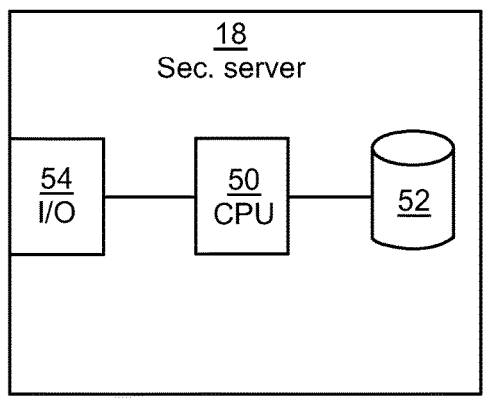
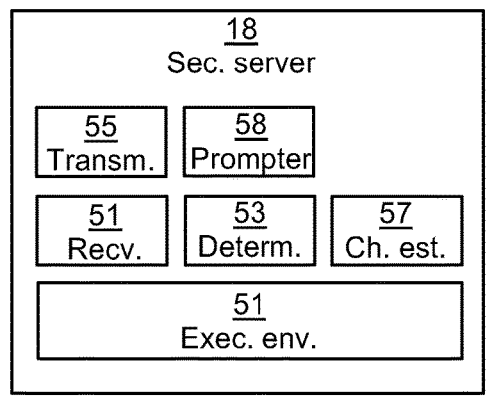
Fig. 4a
Fig. 4b

METHODS, SERVER, MERCHANT DEVICE, COMPUTER PROGRAMS AND COMPUTER PROGRAM PRODUCTS FOR SETTING UP COMMUNICATION

CROSS-REFERENCE TO RELATED APPLICATION

This application is a 35 U.S.C. § 371 National Phase Entry Application from PCT/SE2010/050745 filed Jun. 29, 2010, and designating the United States, the disclosure of which is incorporated by reference herein.

FIELD OF INVENTION

The invention relates to a setting up communication between a merchant device and a customer payment application in a secure element being adapted to be comprised in a mobile communication terminal.

BACKGROUND

In several mobile communication standards, such as GSM and UMTS, every mobile communication terminal is in contact with a smart card, such as a subscriber identity module (SIM) card or a universal integrated circuit cards (UICC). The smart cards provide an execution environment which is more secure than the general execution environment of the mobile communication terminal itself. In fact, equivalent structures have now been developed to allow secure execution environments in memory cards inserted in a mobile communication terminal or even in embedded memory in the mobile communication terminal. Such environments can thus function as secure elements.

GlobalPlatform, see http://www.globalplatform.org at the time of filing of this patent application, provides standards and structures for secure elements and applications on the secure elements. Secure elements allow for one or more applications to be installed, such as applications for payment. For example, a person can have a VISA debit card application and a MasterCard credit card application installed at the same time. The user can then effect payment e.g. using a protocol called Europay-Mastercard-Visa (EMV) protocol, using near field communication (NFC) with a reader and optionally using the user interface of the mobile communication terminal. The use of Near-Field Communications (NFC) capable mobile phones enables contactless payments at a Point-of-Sale (PoS) device e.g. using the EMV protocol between the card application in the secure element and the point-of-sale terminal.

However, there is no structure in the prior art allowing the user to verify the authority of the merchant with which the transaction is occurring. Consequently, it is possible that a fraudulent merchant could get hold of information on the secure elements or even perform fraudulent transactions.

SUMMARY

An object of the invention is to enable prevention of unauthorised access to a customer payment application on a secure element.

According to a first aspect of the invention, it is presented a security server arranged to set up communication between a merchant device and a customer payment application. The security server comprises: a receiver arranged to receive a first message from a merchant device, the first message comprising a customer identifier, an application identifier indicating the customer payment application and a security token for the merchant device; a determiner arranged to determine, using the security token, whether the merchant device is authorised by a scheme provider of the customer payment application; a transmitter arranged to send, only when the merchant device is determined to be authorised by the scheme provider, a second message to the merchant device, the second message indicating that the merchant device is authorised to effect payment using the customer payment application; and a channel establisher arranged to, when the merchant device is determined to be authorised by the scheme provider, set up a secure channel between the merchant device and the customer payment application in a secure element being adapted to be comprised in a mobile communication terminal, wherein all communication between the merchant device and the customer payment application is controlled by the security server.

In other words, the merchant device is determined to be authorised by using the security token. Only when the merchant device is determined to be authorised is the payment process continued. This prevents unauthorised merchant devices to initiate transactions, thereby preventing access to the payment application.

The channel establisher may be arranged such that all communication between the merchant device and the customer payment application is set up to pass via the security server. This provides for even stronger security, since this more directly can prevent the merchant device from communicating with the customer payment application directly.

The security token may comprise a merchant certificate and the determiner may be arranged to determine whether the merchant device is authorised by determining if the merchant certificate is issued by the scheme provider, wherein the scheme provider acts as certification authority. The merchant certificate can also be issued by an intermediate party which in itself has a certificate issued by the scheme provider. Alternatively, several intermediate parties can exist.

The customer identifier may comprise a phone number, an e-mail address, or a network access identifier.

The application identifier may comprise a text string indicating an application, a prefix of an application, or a unique application identifier.

The determiner may be arranged to determine that the merchant device is authorised only when the first message is digitally signed by the merchant device and the identifier of the merchant matches that of the security token.

The determiner may be arranged to determine that the merchant device is authorised only when the security token has a validity date range which encompasses the date when the first message is received.

The first message may comprise a plurality of application identifiers, each indicating a respective one of a plurality of customer payment applications, and the determiner may further be arranged to determine which one of the plurality of customer payment applications is to be used to effect payment; and the second message may comprise an identifier of the customer payment application to be used. In other words, the security server determines which one of a plurality of customer payment applications to use.

The security server may further comprise a prompter arranged to send a prompt message to a mobile terminal corresponding to the customer identifier, to prompt which customer payment application is to be used; and to receive a message from the mobile terminal indicating which one of the plurality of customer payment applications is to be used.

This allows the user to select which customer payment application to use for each transaction.

The first message may comprise a text message; and the prompt message may comprise the text message. The text message can thus be presented to the customer when selecting customer payment application, e.g. to indicate vendor, amount and/or item details.

The determiner may further be arranged to read a database indicating which one of the plurality of customer payment applications is to be used. The customer can e.g. indicate a list of priority or preferred customer payment applications, whereby the customer does not need to select customer payment application for each transaction.

A second aspect of the invention is a method for setting up a communication channel between a merchant device and a customer payment application, performed in a security server. The method comprises the steps, performed in the security server, of: receiving a first message from a merchant device, the first message comprising a customer identifier, an application identifier indicating the customer payment application and a security token for the merchant device; determining, using the security token, whether the merchant device is authorised by a scheme provider of the customer payment application; sending, only when the merchant device is determined to be authorised by the scheme provider, a second message to the merchant device, the second message indicating that the merchant device is authorised to effect payment using the customer payment application; and setting up a secure channel between the merchant device and the customer payment application in a secure element being adapted to be comprised in a mobile communication terminal, wherein all communication on between the merchant device and the customer payment application is controlled by the security server.

The step of setting secure channel may comprise passing all communication between the merchant device and the customer payment application via the security server.

The security token may comprise a merchant certificate and the step of determining may be arranged to determine whether the merchant device is authorised by determining if the merchant certificate is issued by the scheme provider, wherein the scheme provider acts as certification authority.

The customer identifier may comprise a phone number, an e-mail address, or a network access identifier.

The application identifier may comprise a text string indicating an application, a prefix of an application, or a unique application identifier.

The step of determining may comprise determining that the merchant device is authorised only when the first message is digitally signed by the merchant device and the identifier of the merchant matches that of the security token.

The step of determining may comprise determining that the merchant device is authorised only when the security token has a validity date range which encompasses the date when the first message is received.

The first message may comprise a plurality of application identifiers, each indicating a respective one of a plurality of customer payment applications (5a, 5b), wherein the step of determining comprises determining which one of the plurality of customer payment applications (5a, 5b) is to be used to effect payment; and wherein the second message comprises an identifier of the customer payment application (5a, 5b) to be used.

The method may comprise a prompting step comprising sending a prompt message to a mobile terminal (10) corresponding to the customer identifier, prompting which customer payment application is to be used; and receiving a message from the mobile terminal (10) indicating which one of the plurality of customer payment applications (5a, 5b) is to be used.

The first message may comprise a text message; and the prompt message may comprise the text message.

The step of determining may comprise reading a database indicating which one of the plurality of customer payment applications (5a, 5b) is to be used.

A third aspect of the invention is a computer program comprising computer program code executable in a controller of a security server. The computer program code, when run on the controller, causes the security server to perform the steps of: receiving a first message from a merchant device, the first message comprising a customer identifier, an application identifier indicating the customer payment application and a security token for the merchant device; determining, using the security token, whether the merchant device is authorised by a scheme provider of the customer payment application; sending, only when the merchant device is determined to be authorised by the scheme provider, a second message to the merchant device, the second message indicating that the merchant device is authorised to effect payment using the customer payment application; and setting up a secure channel between the merchant device and the customer payment application in a secure element being adapted to be comprised in a mobile communication terminal, wherein all communication between the merchant device and the customer payment application is controlled by the security server.

A fourth aspect of the invention is a computer program product comprising a computer program according to the third aspect and a computer readable means on which the computer program is stored.

A fifth aspect of the invention is a merchant device arranged to receive authorisation of the merchant device and to be used in conjunction with receiving input indicating a desire to perform a purchase. The merchant device comprises: a customer identifier obtainer arranged to obtain a customer identifier; a transmitter arranged to send a first message to a security server, the first message comprising the customer identifier obtained by the customer identifier obtainer, an application identifier indicating a customer payment application and a security token for the merchant device; a receiver arranged to receive a second message from the security server, the second message only being received when the merchant device is determined to be authorised by a scheme provider, wherein the customer payment application is comprised in a secure element being adapted to be comprised in a mobile communication terminal; and a channel establisher arranged to set up a secure channel with the secure element of the mobile communication terminal to effect payment using the customer payment application.

The application identifier in the first message may be the same as the application identifier of the second message.

The first message may comprise a plurality of application identifiers, each indicating a respective customer payment application.

The second message may comprise application identifiers for a subset or all of the plurality of application identifiers of the first message, and the security device may be arranged to effect payment using one of the applications associated with the application identifiers of the second message.

The security device may further be arranged to receive input, when the subset or all of the plurality of application identifiers consists of more than one application identifier, the input indicating which of the subset or all of the plurality of application identifiers of the first message is to be used to effect payment.

The channel establisher may be arranged to set up a secure channel over a wide area network with the secure element of the mobile communication terminal.

A sixth aspect of the invention is a method for receiving authorisation of a merchant device, performed in the merchant device in conjunction with receiving input indicating a desire to perform a purchase. The method comprises the steps, performed in the merchant device, of: obtaining a customer identifier; sending a first message to a security server, the first message comprising the customer identifier, an application identifier indicating a customer payment application and a security token for the merchant device; receiving a second message from the security server, the second message only being received the merchant device is determined to be authorised by a scheme provider, wherein the customer payment application is comprised in a secure element being adapted to be comprised in a mobile communication terminal; and setting up a secure channel with the secure element of the mobile communication terminal to effect payment using the customer payment application.

The application identifier in the first message may be the same as the application identifier of the second message.

The first message may comprise a plurality of application identifiers, each indicating a respective customer payment application.

The second message may comprise application identifiers for a subset or all of the plurality of application identifiers of the first message, and the security device may be arranged to effect payment using one of the applications associated with the application identifiers of the second message.

The method may further comprise a step of receiving input, when the subset or all of the plurality of application identifiers consists of more than one application identifier, the input indicating which of the subset or all of the plurality of application identifiers of the first message is to be used to effect payment.

The step of setting up a secure channel may comprise setting up a secure channel over a wide area network with the secure element of the mobile communication terminal.

A seventh aspect of the invention is a computer program comprising computer program code executable in a controller of a merchant device in conjunction with receiving input indicating a desire to perform a purchase. The computer program code, when run on the controller, causes the merchant device to perform the steps of: obtaining a customer identifier; sending a first message to a security server, the first message comprising the customer identifier, an application identifier indicating a customer payment application and a security token for the merchant device; receiving a second message from the security server, the second message only being received the merchant device is determined to be authorised by a scheme provider, wherein the customer payment application is comprised in a secure element being adapted to be comprised in a mobile communication terminal; and setting up a secure channel with the secure element of the mobile communication terminal to effect payment using the customer payment application.

An eighth aspect of the invention is a computer program product comprising a computer program according to the seventh aspect and a computer readable means on which the computer program is stored.

It is to be noted that any feature of the first, second, third and fourth aspects may, where appropriate, be applied to any other aspects of these aspects. Analogously any feature of the fifth, sixth, seventh, and eighth aspects may, where appropriate, be applied to any other aspects of these aspects.

It is to be noted that whenever the term plurality is used herein it is to be construed as more than one.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF DRAWINGS

The invention is now described, by way of example, with reference to the accompanying drawings, in which:

FIG. 3a is a schematic diagram showing hardware components of a merchant device of FIGS. 1a-b;

FIG. 3b is a schematic diagram showing functional modules of a merchant device of FIGS. 1a-b;

FIG. 4a is a schematic diagram showing hardware components of a security server of FIGS. 1a-b;

FIG. 4b is a schematic diagram showing functional modules of a security server of FIGS. 1a-b;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
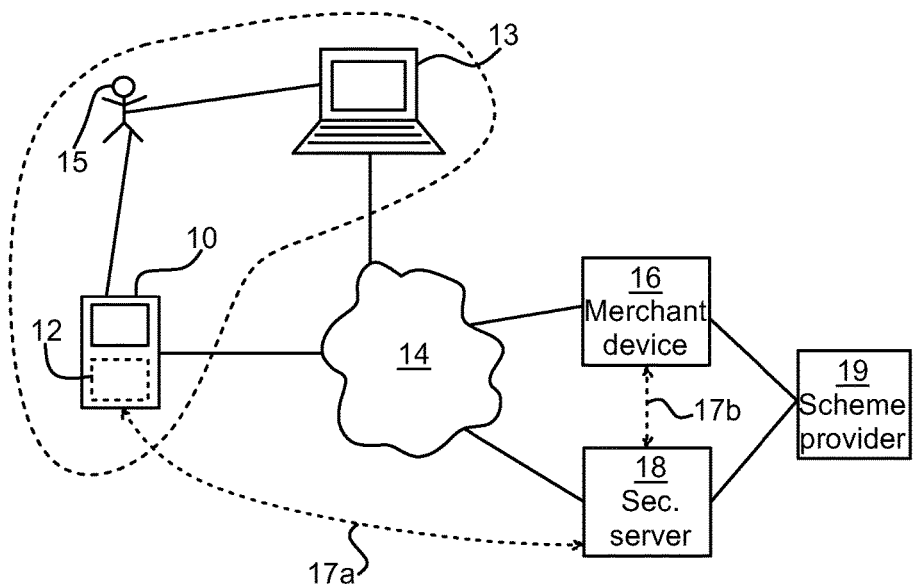
FIG. 1a is a schematic diagram illustrating a first environment in which embodiments of the invention can be applied.

FIG. 1a is a schematic diagram illustrating a first environment in which embodiments of the invention can be applied.

A customer 15 is in contact with a merchant device 16 via a wide area network 14, such as the Internet. In this way, the customer 15 has indicated, e.g. using a computer 13 or a mobile communication terminal 10, the desire to effect a purchase with the merchant corresponding to the merchant device 16. This desire to effect a purchase can for example be to buy something using a web shop, using a phone sales person or in a physical shop. In the case of a physical shop, the customer 15 can e.g. receive a URI (Uniform Resource Indicator) for performing the purchase using NFC or a 2D barcode, which NFC tag or 2D barcode can be located on the product to be purchased. The mobile communication terminal 10 can then communicate with the merchant device 16, e.g. as pointed to by the provided URI, using the wide are network to indicate the desire to purchase the product in question.

The mobile communication terminal 10 comprises an embedded secure element 12. The mobile communication terminal 10 can be any suitable portable mobile terminal, such as a mobile (cellular) phone adhering to any one or more of the standards GSM (Global System for Mobile Communications), UMTS (Universal Mobile Telecommunications System), W-CDMA (Wideband Code Division Multiple Access), CDMA-2000 (Code Division Multiple Access-2000), FOMA (Freedom of Mobile Multimedia Access), WiMax/IEEE 802.16 and/or LTE (Long Term Evolution). Alternatively or additionally, the mobile communication terminal is connected to the wide area network 14 using any suitable Wi-Fi protocol, e.g. any of the IEEE 802.11x protocols. The wide area network 14 in this context also includes components allowing the mobile communication terminal 10 to communicate with the wide area network.

The merchant device 16 is any server suitable to perform the methods as explained in more detail below. A security server 18 is connected to the merchant device 16. Typically, the security server 18 is connected to a plurality of merchant devices 16, where each merchant or shop has at least one merchant device 16. The merchant device 16 and the security server can be connected via the wide area network 14 and/or through some other way (not shown) such as a direct local area network connection. A scheme provider 19 is the overall overseeing party of the transaction. For example, the scheme provider 19 could be MasterCard or VISA, or any other credit card company.

When the merchant device 16 and the secure element 12 need to be in communication, this occurs only via a secure channel 17*a-b*, where all communication over this secure channel is controlled by the security server 18. The security server 18 is in turn in contact with the mobile communication terminal 10 and the embedded secure element 12. In other words, by the security server controlling the communication between the merchant device 16 and the secure element 12, no communication between the merchant device 16 and the secure element 12 can occur without the approval of the security server 18.

Figure 1B:
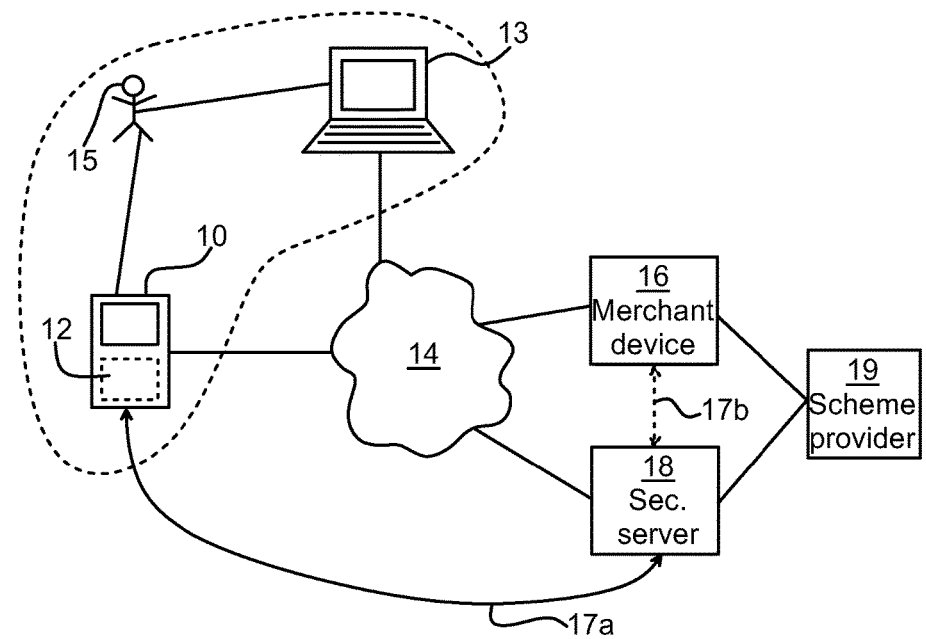
FIG. 1b is a schematic diagram illustrating a second environment in which embodiments of the invention can be applied.

FIG. 1*b* is a schematic diagram illustrating a second environment in which embodiments of the invention can be applied. The main difference here is that the mobile communication terminal 10 is in contact with the security server 18 in some other way than through the wide area network 14, e.g. through a mobile communication network.

With reference to both FIGS. 1*a* and 1*b*, the present embodiment is related to payment by the customer 15 to a merchant running the merchant device 16. This is effected using a payment card application running on the secure element 12 bundled with a mobile phone as explained above. The secure element 12 may be implemented using a subscriber identity module (SIM) card or a universal integrated circuit cards (UICC), a memory card (e.g. an SD) inserted in the mobile communication terminal or the secure element 12 may be embedded directly in the memory of the mobile communication terminal.

The secure element 12 and its applications are normally not managed by the customer 15 alone, but by some application owning entity with which the customer 15 has a billing relationship (network operator, bank, etc) or other relationship (e.g. terminal manufacturer). The GlobalPlatform forum has issued a suite of smart card specifications for remote management, allowing the application owning entity to manage applications on the secure element 12.

In general, multiple applications co-exist in the secure element and are managed by different parties. For example, a network operator may be in control of a USIM (Universal Subscriber Identity Module) application, a bank may be managing one or more payment and/or identity applications, and other parties manage their access/payment/loyalty applications. It has been proposed by GSMA (GSM [Global System for Mobile Communication] association) and others that there is a need for a brokering entity between the entities interfacing the secure element. Part of this brokering entity is implemented here in the security server 18.

Figure 2A:
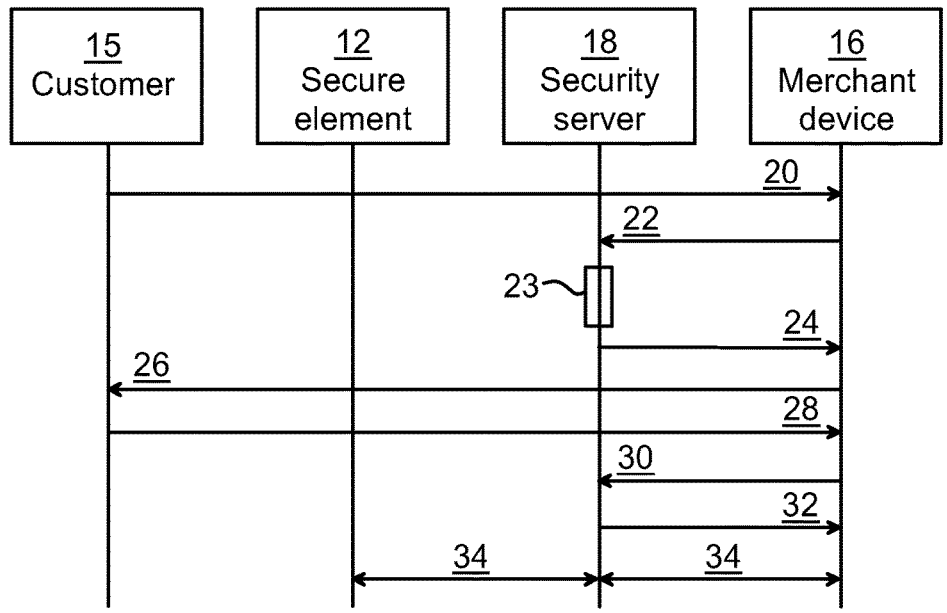
FIG. 2a is a sequence diagram illustrating communication in a first embodiment when a customer performs a purchase using components of FIGS. 1a-b.

FIG. 2*a* is a sequence diagram illustrating communication in a first embodiment when a customer performs a purchase using components of FIGS. 1*a-b*.

The customer 15 first indicates 20 the desire to effect a payment to the merchant device 16. This can for example be by browsing a web shop and indicating a desire to pay, or agreeing to pay for a service or product to a phone salesperson. In this step, a customer identifier, such as a phone number, MSISDN (Mobile Subscriber Integrated Services Digital Network Number), an e-mail address or any other network access identifier is communicated from the customer 15 to the merchant device 16.

The merchant device 16 then sends a message 22 to the security server 18 with the customer identifier and application identifiers for one or more customer payment applications (e.g. VISA, MasterCard, American Express, Diners Club etc.) that the merchant of the merchant device 16 would like to use. The application identifier can comprise a text string indicating an application, a prefix of an application, or a unique application identifier in accordance with EMV. Furthermore, a security token for the merchant device 16 is included, as evidence that the merchant device is allowed to access the one or more customer payment applications. The security token comprises a certificate which has previously been issued by the scheme provider 19 or an intermediate party to the merchant device 16 authorising the merchant device 16 for one or more customer payment applications; one token is provided for each scheme provider e.g. VISA or MasterCard. For example, the security token can comprise an electronic signature complying with public key infrastructure. In this way, the merchant device generates the signature using its private key, whereby the security server 18 can (1) verify that the signature matches the public key of the merchant device as written in the security token, thereby authenticating the merchant; and (2) verify that the security token or certificate is valid, by verifying the digital signature of the token, checking expiry time, validating against revocation lists and other standard PKI operations to thereby verify the merchant device's authority to contact the customer payment application.

By using the security token, the customer 15 is assured that the merchant device 16 of the merchant is certified, thereby enabling only authorised merchants to use corresponding payment applications as well as significantly reducing the risk of the merchant committing fraudulent transactions affecting the customer 15.

The security server 18 then verifies 23, using the security token, that the merchant device 16 is authorised to access the customer payment applications. Optionally, the security server can also here filter the list of customer payment applications provided by the merchant device 16. For example, customer payment applications that are unavailable on the secure element in question or customer payment applications that are not verified are removed from the list.

The security server 18 then sends a message 24 to the merchant device with identifiers for one or more customer payment applications that the merchant device 16 is allowed to contact, after any filtering performed by the security server 18. Optionally, the security server 18 can establish one or more secure payment channels with the secure element 12 at this stage, and include handles to such secure payment channels in the message 24 to the merchant device.

If several tokens corresponding to different customer payment applications were sent, the merchant device 16 queries 26, using the prior sales channel, the customer 15 which customer payment application to use. For example, this can occur through a web interface for a web shop, or by the phone salesperson asking the customer over the phone. The customer 15 then selects 28 which customer payment application to use. It is to be noted, however, that this query 26 is by no means using the secure element 12.

Unless a payment channel already has been established, as explained above, the merchant device 16 sends a message 30 to the security server 18 to establish a secure payment channel to the secure element 12. The security server then sets up a secure channel and responds 32 to the merchant device 16 to allow the merchant device to communicate with the payment application on the secure element 12. If a text string or application prefix is used as application identifier before, the security server here communicates an application id that the merchant device can use if further communicating with the customer payment application.

The merchant device 16 then communicates 34 with the determined customer payment application on the secure element 12 to effect payment, e.g. using the (EMV) protocol. While the EMV protocol is known per se, it has up to now only been used for direct communication between the merchant device and the secure element when the secure element is inserted into a point of sale or in physical proximity by using NFC interactions. In contrast here, all communication between the merchant device 16 and the secure element 12 is effected under the control of the security server 18. Since the merchant device 16 only communicate with the secure element 12 under the control of the security server 18, and since only merchant devices which are authorised for the determined customer payment application get to this point, fraudulent merchant devices 16 are prevented from accessing applications in the secure element 12. Moreover, the merchant device is prevented from querying applications for which the merchant device is unauthorised. For example, if direct communication were to be allowed between the merchant device and the customer applications, the merchant device could attempt contacting various customer applications, which compromises the privacy of the customer. Indeed, if direct communication were to be allowed between the merchant device and the secure element, the mere existence of certain customer applications could be disclosed which compromises the privacy of the customer.

The secure channel can for example be implemented using SSL, Secure Sockets Layer, & SCP80, Secure Channel Protocol 80. This allows the merchant device 16 to use APDUs (Application Protocol Data Unit) to effect payment by communicating with the determined customer payment application.

Figure 2B:
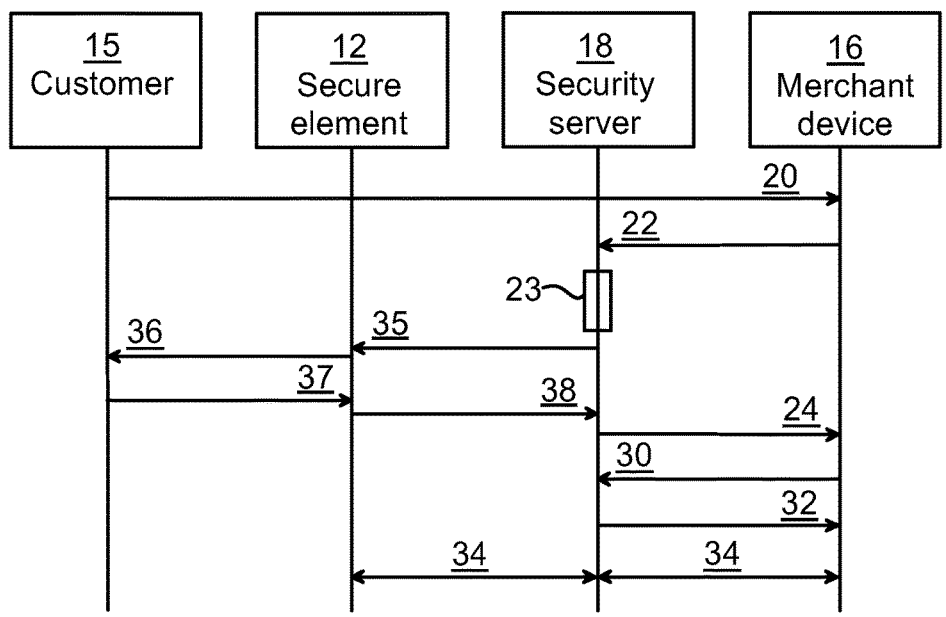

FIG. 2b is a sequence diagram illustrating communication in a second embodiment when a customer performs a purchase using components of FIGS. 1a-b. The main difference compared to the embodiment of FIG. 2a, is that the security server 18 determines what customer payment application to use. The communication signals 20, 22, 24, 34 and the processing 23 correspond to those of FIG. 2a.

However, in this embodiment, if the message 22 from the merchant device contains a plurality of customer payment applications, the security server 18 determines at this stage 23 which one of the plurality of customer payment applications to use for the remainder of the transaction. This can for example be performed by the security server sending a message 35 to the secure element 12 to query 36 the customer 15 which customer payment application to use by means of a Java MidLet, a web application or a separate application running on the secure element 12. The customer 15 can then select 37 which customer payment application to use, after which this selection is communicated 38 to the security server 18.

As an example, the merchant device 16 indicates 22 that it can use VISA, MasterCard or American Express for payment. The security server 18 then queries a database or triggers logic on the customer's 15 mobile communication terminal, to determine that the user only has a VISA and a MasterCard customer payment application. The customer is presented with the option to pay with VISA or MasterCard (i.e. using the VISA customer payment application or the MasterCard customer payment application), whereby the user selects, using the user interface of the mobile communication terminal 10, to pay using the VISA customer payment application on the secure element 12.

The merchant device 16 then sends a message 30 to the security server 18 to establish a secure payment channel to the secure element 12. The security server sets up a secure channel and responds 32 to the merchant device 16 to allow the merchant device to communicate with the payment application on the secure element 12.

The communication 34 between the merchant device 16 and the secure element 12 via the security server 18 is effected as in the embodiment illustrated in FIG. 2a.

In one embodiment, when the message 22 from the merchant device 16 contains a plurality of customer payment applications, the security server 18 obtains a list of allowable customer payment applications e.g. using messages 35 and 38, from the secure element 12. In one embodiment, the security server 18 queries a contactless registry service (CRS), e.g. as defined in the GlobalPlatform Card Specification Amendment C, on the secure element 12 where such a list of allowable customer payment applications is stored. The customer 15 has then previously defined a list of allowable customer payment applications. The security server 18 determines the intersecting set of the list of customer payment applications from the merchant device 16 and the list of allowable payment applications from the secure element 12. This intersecting set then contains all customer payment applications that the merchant device is requesting and the customer 15 approves of. This intersecting list (which could contain zero, one or more items) is then sent 24 to the merchant device 16 and is used subsequently as described above.

FIG. 3a is a schematic diagram showing hardware components of a merchant device 16 of FIGS. 1a-b. A controller 46 is provided using any suitable central processing unit (CPU), microcontroller, digital signal processor (DSP), etc., capable of executing software instructions stored in a computer program product 45 e.g. in the form of a memory. The computer program product 45 can be a memory or any combination of read and write memory (RAM) and read only memory (ROM). The memory also comprises persistent storage, which, for example, can be any single one or combination of magnetic memory, optical memory, or solid state memory or even remotely mounted memory.

An input/output (I/O) interface 40 is provided to allow the merchant device 16 to interact with other components, such as the security server 18. The I/O interface 40 can for example be a network interface such as an Ethernet interface.

The merchant device 16 can be implemented in the same web server used for a web shop or it may be a separate server.

FIG. 3b is a schematic diagram showing functional modules of a merchant device of FIGS. 1a-b. The modules can be implemented using software of the merchant device, such as a computer program. All modules depend on an execution environment 41 which utilises the controller 46 and optionally the computer program product 45 and the I/O interface 40 of FIG. 3a.

A customer identifier obtainer 42 is arranged to obtain a customer identifier. The source for the customer identifier can e.g. be from a web shop transaction or http request from a mobile communication terminal.

A transmitter 43 is arranged to send a first message to a security server 18, where the first message can comprise the customer identifier obtained by the customer identifier obtainer, an application identifier indicating a customer payment application and a security token for the merchant device. This allows the security server to authenticate the merchant device 16.

A receiver 47 is arranged to receive a second message from the security server 18 as a response to the first message. The second message would only be received when the security token is determined to be authorised for the customer payment application by the scheme provider matches an application identifier of the customer payment application.

The merchant device further comprises a channel establisher 44 which is arranged to set up a secure channel with the secure element of the mobile communication terminal to effect payment using the customer payment application. The secure channel is only set up after a second message has been received by the receiver 47. Payment can then be effected between the merchant device and the customer payment application using the secure channel.

FIG. 4a schematically shows an embodiment of the security server 18 of FIGS. 1a-b. A controller 50 is provided using any suitable central processing unit (CPU), microcontroller, digital signal processor (DSP), etc., capable of executing software instructions stored in a computer program product 52, e.g. in the form of a memory. The computer program product 52 can be a memory or any combination of read and write memory (RAM) and read only memory (ROM). The memory also comprises persistent storage, which, for example, can be any single one or combination of magnetic memory, optical memory, or solid state memory or even remotely mounted memory.

An input/output interface 54 is provided to allow the security server 18 to interact with other components, such as the merchant device 16. The I/O interface 54 can for example be a network interface such as an Ethernet interface.

Optionally, a user interface is provided (not shown) for operator usage of the security server 18. Additionally or alternatively, the security server 18 can be operated remotely or locally using the receiver/transmitter 54.

The security server 18 can be integrated in one unit, or it can be separated into several separate units, e.g. for reasons of upgradeability, ease of implementation or redundancy. In the case that there are several units that make up the security server 18, some components may be present in more than one unit, such as the controller 50, the receiver/transmitter 54 and/or the computer program product 52.

FIG. 4b is a schematic diagram showing functional modules of a security server of FIGS. 1a-b. The modules can be implemented using hardware and/or software of the security server. All modules depend on an execution environment 51 which utilises the controller 50 and optionally the computer program product 52 and the I/O interface 54 of FIG. 4a.

A receiver 51 is arranged to receive the first message from a merchant device as described above.

A determiner 53 is arranged to determine whether the merchant device is authorised by the scheme provider of the customer payment application. This can be done by verifying that the security token comprises a certificate which has been issued by the scheme provider or an intermediate party. In other words, the match can be determined using public key infrastructure.

A transmitter 55 is arranged to send a second message to the merchant device when the security token matches the application identifier of the customer payment application. The second message is the same second message as described above with reference to FIG. 3b.

Furthermore, the security server comprises a channel establisher 57. Only when the merchant device is authorised by a scheme provider of the customer payment application, can the channel establisher set up a secure channel between the merchant device and the customer payment application. The channel establisher can effect this set up of the secure channel by controlling the communication between the merchant device and the customer payment application. Alternatively or additionally, the channel established can ensure that all communication between the merchant device and the customer payment application is passed via the security server. This is performed in cooperation with the channel establisher 44 of the merchant device. In this way, all communication between the merchant device and the customer payment application is controlled by the security server.

Figure 5:
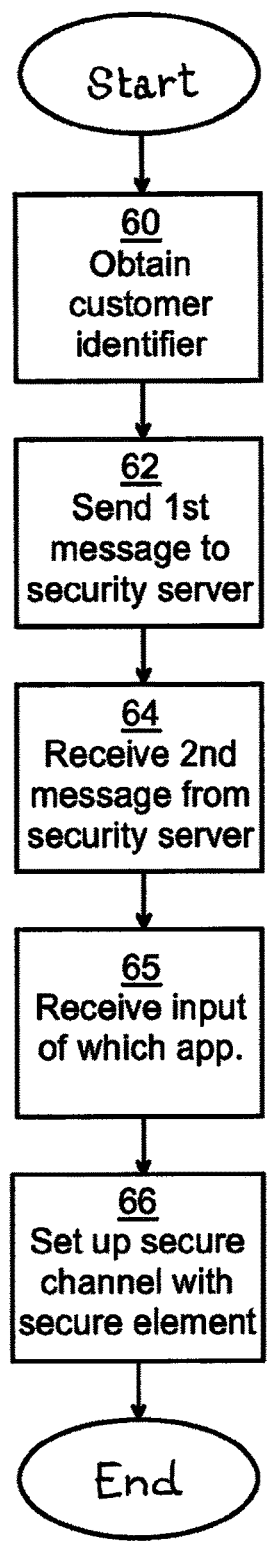
FIG. 5 is a flow chart illustrating a method performed in the merchant device of FIGS. 1a-b.

FIG. 5 is a flow chart illustrating a method performed in the merchant device 16 of FIGS. 1a-b. The method can be implemented using modules of FIG. 3b. The flow chart corresponds to the sequence diagrams of FIGS. 2a-b.

In an initial obtain customer identifier step 60, the merchant device receives an input indicating a desire to perform a purchase and obtains the identifier of the customer, e.g. through customer input in a web shop or by the customer saying the identifier to a salesperson who enters the identifier into the merchant device 16.

In a send first message to the security server step 62, the merchant device 16 sends a message comprising the customer identifier, identifiers of one or more customer payment applications and a security token, to the security server.

In a receive second message from the security server step 64, the merchant device 16 receives a message from the security server, the message comprising identifiers of one or more customer payment applications that the merchant device 16 is allowed to contact.

In an optional receive input of which application step 65, the merchant device queries the customer which one of a plurality of customer payment applications to use to effect payment.

Finally, in a set up secure channel with secure element step 66, the merchant device contacts the security server 18 to set up a secure channel with the secure element to effect payment. All communication on the secure channel occurs under the control of the security server 18.

Figure 6:
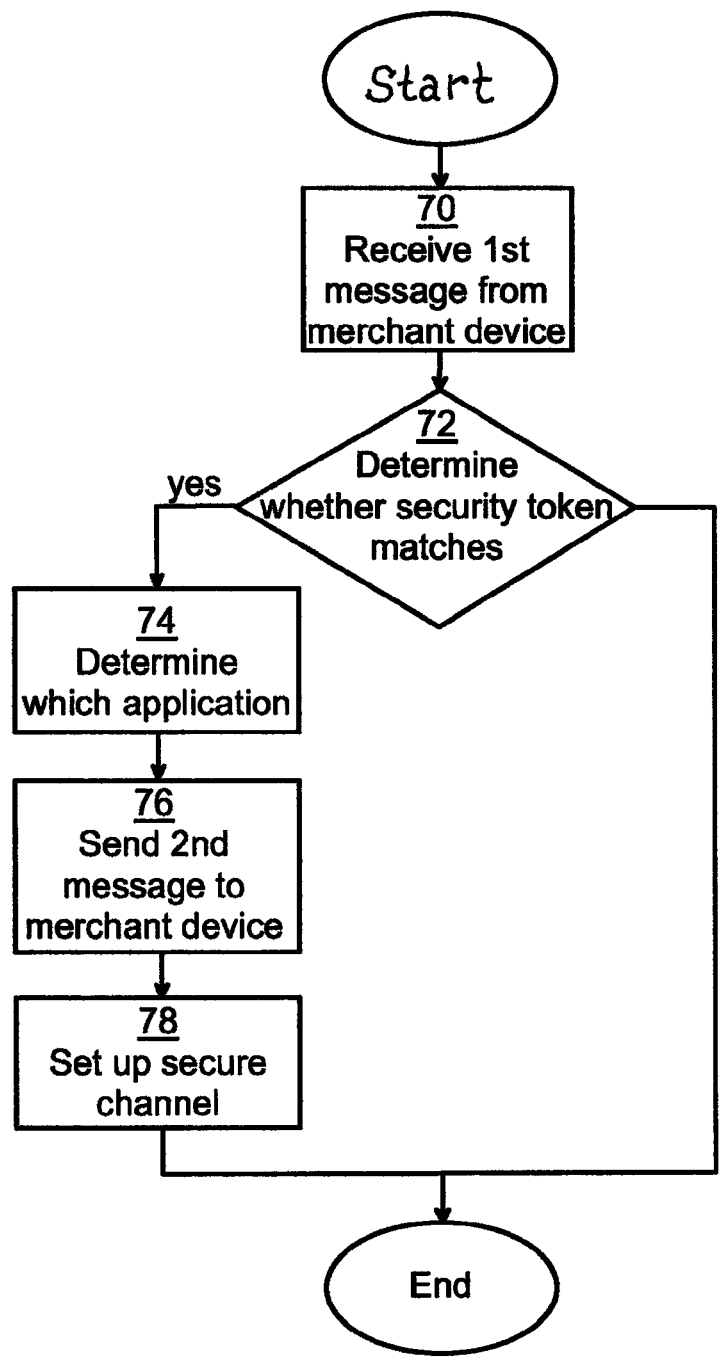
FIG. 6 is a flow chart illustrating a method performed in the security server of FIGS. 1a-b.

FIG. 6 is a flow chart illustrating a method performed in the security server of FIGS. 1a-b. The method can be implemented using modules of FIG. 4b. The flow chart corresponds to the sequence diagrams of FIGS. 2a-b.

In an initial receive first message from merchant device step 70, the security server receives a message from the merchant device. The first message comprises the customer identifier, identifiers of one or more customer payment applications and a security token.

In a conditional determine whether security token matches step 72, the security server checks whether the merchant device is authorised by the scheme provider of the customer payment application, and which ones, if any, of the customer payment applications of the first message matches the security token. If there is no match, the method ends, otherwise, the method continues to an optional determine which application step 74 or directly to a send second message to merchant device step 76.

In the optional determine which application step 74, the security server 18 determines which customer payment application should be used for the payment transaction. If there is only one verified customer payment application, that customer payment application is used. However, if there are more than one customer payment application, the security server 18 can optionally query a database table, e.g. stored in memory, to find out which customer payment applications this particular customer has installed. Alternatively or additionally, the security server 18 queries the user via the secure element and/or the mobile communication terminal which customer payment application to use.

Once the customer payment application to use has been established, the security server 18 server sends a second message to the merchant device indicating which customer payment application to use. Optionally, if determine which application step 74 is not executed, the security server 18 can in this step send a plurality of customer payment applications identifiers to the merchant device and let the merchant device determine which one of these customer payment applications to use.

In a set up secure channel step 78, the security server 18 sets up, on instruction from the merchant device 16, a secure channel between the merchant device 16 and the secure element 12.

Figure 7:
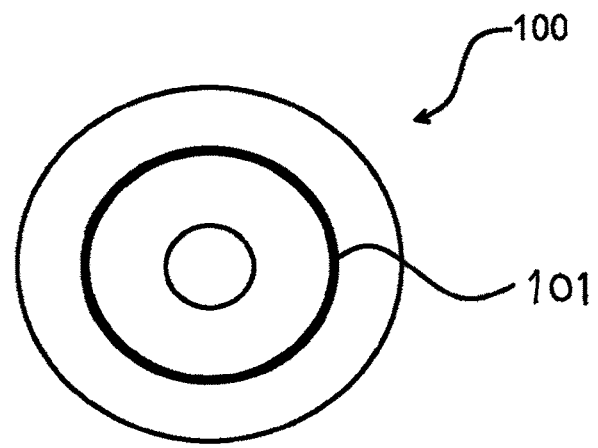
FIG. 7 shows one example of a computer program product 100 comprising computer readable means.

FIG. 7 shows one example of a computer program product 100 comprising computer readable means. On this computer readable means a computer program 101 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 45 of the merchant device 16 or memory 52 of the security server 18. While the computer program 101 is here schematically shown as a track on the depicted optical disk, the computer program can be stored in any way which is suitable for the computer program product.

Figure 8:
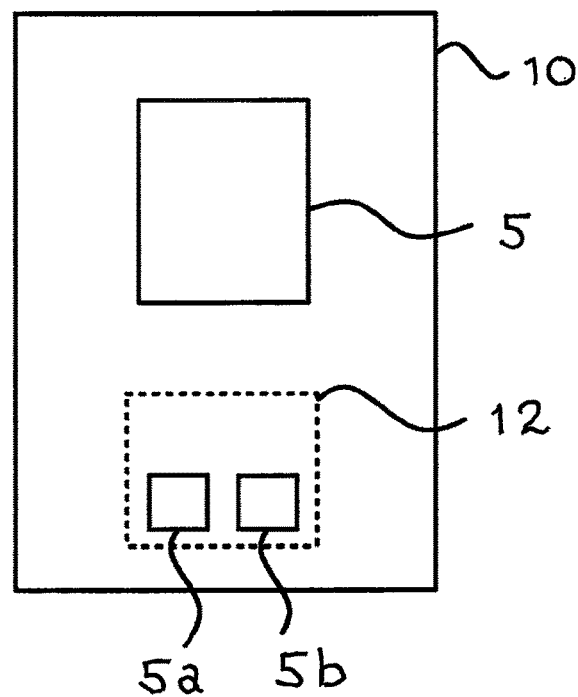
FIG. 8 illustrates the relationship between the mobile communication terminal of FIGS. 1a-b, the secure element of FIGS. 1a-b and applications on the secure element.

FIG. 8 illustrates the relationship between the mobile communication terminal 10 of FIGS. 1a-b, the secure element 12 of FIGS. 1a-b and applications 5a-b on the secure element. The mobile communication terminal 10 comprises a user interface comprising e.g. a display 5 and user input means, e.g. implemented by providing the display 5 as a touch sensitive display, or using a keypad.

As mentioned earlier, the secure element 12 may be implemented using a subscriber identity module (SIM) card or a universal integrated circuit cards (UICC), a memory card (e.g. an SD) inserted in the mobile communication terminal or the secure element 12 may be embedded directly in the memory of the mobile communication terminal. The secure element 12 comprises one or more customer payment applications 5a-b. Other applications (not shown), e.g. for access or loyalty programs, can also exist on the secure element 12.

The invention has mainly been described above with reference to a few embodiments. However, as is readily appreciated by a person skilled in the art, other embodiments than the ones disclosed above are equally possible within the scope of the invention.

The invention claimed is:

1. A merchant device comprising a processor and a memory, said memory operatively coupled to said processor and storing instructions that, when executed by said processor, cause said processor to perform the steps of:
   receiving a merchant device security token from a scheme provider;
   receiving, from a mobile communication terminal, a first request to perform a purchase using the mobile communication terminal with a secure element having one or more customer payment applications;
   obtaining a customer identifier associated with the mobile communication terminal;
   sending a first message to a security server, the first message comprising the customer identifier, the merchant device security token, and one or more application identifiers indicating at least one of the one or more customer payment applications;
   receiving, from the security server, an indication that the merchant device is authorized;
   in response to receiving the indication that the merchant device is authorized, setting up a secure channel with the secure element of the mobile communication terminal, wherein setting up the secure channel includes (i) sending, to the security server, a second request to set up the secure channel with the secure element of the mobile communication terminal and (ii) receiving, from the security server a response; and
   performing a payment transaction by communicating on the secure channel with one of the customer payment applications indicated in the first message,
   wherein communicating on the secure channel with one of the customer payment applications indicated in the first message includes communicating with said one of the customer payment applications through the security server.

2. The merchant device according to claim 1, wherein the indication that the merchant device is authorized includes an application identifier and at least one of the application identifiers in the first message is the same as the application identifier in the indication.

3. The merchant device according to claim 1, wherein the first message comprises a plurality of application identifiers, each indicating a respective customer payment application.

4. The merchant device according to claim 3, wherein the indication that the merchant device is authorized comprises application identifiers for a subset or all of the plurality of application identifiers of the first message, and wherein performing the payment transaction further comprises performing the payment transaction by communicating on the secure channel with one of the applications associated with the application identifiers of the indication.

5. The merchant device according to claim 3, wherein when the subset or all of the plurality of application identifiers consists of more than one application identifier, performing the payment transaction further comprises receiving an input indicating which of the subset or all of the plurality of application identifiers of the first message is to be used to perform payment; and performing the payment transaction based on said received input.

6. The merchant device according to claim 1, wherein communicating on the secure channel further comprises communicating on the secure channel over a wide area network with the secure element of the mobile communication terminal.

7. A method for authorizing a merchant device, said method comprising:
receiving, at the merchant device, a merchant device security token from a scheme provider;
receiving, at the merchant device, a first request from a mobile communication terminal to perform a purchase using the mobile communication terminal with a secure element having one or more customer payment applications;
obtaining, at the merchant device, a customer identifier associated with the mobile communication terminal;
sending, from the merchant device, a first message to the security server, the first message comprising the customer identifier, the merchant device security token, and one or more application identifiers indicating at least one of the one or more customer payment applications;
receiving, at the merchant device and from the security server, an indication that the merchant device is authorized;
in response to receiving the indication that the merchant device is authorized, setting up, by the merchant device, a secure channel with the secure element of the mobile communication terminal, wherein setting up the secure channel includes (i) sending, from the merchant device, to the security server, a second request to set up the secure channel with the secure element of the mobile communication terminal and (ii) receiving, by the merchant device from the security server, a response; and
performing, by the merchant device, a payment transaction by communicating on the secure channel with one of the customer payment applications indicated in the first message,
wherein communicating on the secure channel with one of the customer payment applications indicated in the first message includes communicating with said one of the customer payment applications through the security server.

8. A non-transitory computer readable medium storing computer program code executable in a controller of a merchant device, wherein the computer program code, when executed by the controller of the merchant device, causes the controller of the merchant device to perform the steps of:
receiving a merchant device security token from a scheme provider;
receiving from a mobile communication terminal a first request to perform a purchase using the mobile communication terminal with a secure element having one or more customer payment applications;
obtaining a customer identifier associated with the mobile communication terminal;
sending a first message to the security server, the first message comprising the customer identifier, the merchant device security token, and an application identifier indicating at least one of the one or more customer payment applications;
receiving from the security server, an indication that the merchant device is authorized;
in response to receiving the indication that the merchant device is authorized, setting up a secure channel with the secure element of the mobile communication terminal, wherein setting up the secure channel includes (i) sending, to the security server, a second request to set up the secure channel with the secure element of the mobile communication terminal and (ii) receiving, from the security server a response; and
performing a payment transaction by communicating on the secure channel with one of the customer payment applications indicated in the first message,
wherein communicating on the secure channel with one of the customer payment applications indicated in the first message includes communicating with said one of the customer payment applications through the security server.

9. The merchant device of claim 1, wherein the application identifier is at least one of a text string indicating an application, a prefix of an application, and a unique application identifier associated with the customer payment application of the mobile communication terminal.

10. The merchant device of claim 1, wherein the obtained customer identifier is at least one of a phone number, an e-mail address, and a network access identifier.

11. The merchant device of claim 1, wherein said merchant device security token is a merchant certificate received from the scheme provider associated with the security server.

12. The merchant device of claim 11, wherein said merchant certificate has an associated date range.

13. The merchant device of claim 1, wherein the merchant device security token comprises an electronic signature based on a private key of the merchant device.

14. The merchant device of claim 1, wherein the merchant device security token sent in the first message to security server is unique to the security server or the scheme provider associated with the security server.

15. The merchant device of claim 1, wherein performing the payment transaction further comprises performing the payment transaction using a Europay-Mastercard-Visa (EMV) protocol.

16. The method of claim 7, wherein the application identifier is at least one of a text string indicating an application, a prefix of an application, and a unique application identifier associated with the customer payment application of the mobile communication terminal.

17. The method of claim 7, wherein the obtained customer identifier is at least one of a phone number, an e-mail address, and a network access identifier.

18. The method of claim 7, wherein said merchant device security token is a merchant certificate received from the scheme provider associated with the security server.

19. The method of claim 18, wherein said merchant certificate has an associated date range.

20. The method of claim 7, wherein the merchant device security token comprises an electronic signature based on a private key of the merchant device.

21. The method of claim 7, wherein the merchant device security token sent in the first message to security server is unique to the security server or the scheme provider associated with the security server.

22. The method of claim 7, wherein the first message comprises a plurality of application identifiers, each indicating a respective customer payment application.

23. The method of claim 22, wherein the indication that the merchant device is authorized comprises application identifiers for a subset or all of the plurality of application identifiers of the first message, and
   wherein performing the payment transaction further comprises performing the payment transaction by communicating on the secure channel with one of the applications associated with the application identifiers of the indication.

24. The method of claim 22, wherein the subset or all of the plurality of application identifiers consists of more than one application identifier, further comprising:
   receiving an input indicating which of the subset or all of the plurality of application identifiers of the first message is to be used to perform payment; and
   performing the payment transaction based on said received input.

* * * * *

UNITED STATES PATENT AND TRADEMARK OFFICE
CERTIFICATE OF CORRECTION

PATENT NO. : 10,007,904 B2
APPLICATION NO. : 13/806451
DATED : June 26, 2018
INVENTOR(S) : Eld et al.

Page 1 of 1

It is certified that error appears in the above-identified patent and that said Letters Patent is hereby corrected as shown below:

On the Title Page

Item [75], delete "Goran" and insert -- Göran --, therefor.

In the Drawings

Fig. 6, Drawing Sheet 5 of 6, delete "  " and insert --  --, therefor.

In the Specification

Column 6, Line 28, delete "FIG. 2a" and insert -- FIG. 2b --, therefor.

Column 6, Line 29, delete "first embodiment" and insert -- second embodiment --, therefor.

Column 7, Line 10, delete "wide are" and insert -- wide area --, therefor.

Signed and Sealed this
Twentieth Day of November, 2018

Andrei Iancu
*Director of the United States Patent and Trademark Office*